United States Patent [19]

Chung et al.

[11] Patent Number: 5,901,135
[45] Date of Patent: May 4, 1999

[54] SIGNAL CONSTELLATION TIME DIVISION MULTIPLEXING ARRANGEMENT

[75] Inventors: Hong Yang Chung, Eatontown; Massimo Sorbara, Freehold, both of N.J.

[73] Assignee: Lucent Technologies, Inc., Murray Hill, N.J.

[21] Appl. No.: 08/808,703

[22] Filed: Feb. 28, 1997

Related U.S. Application Data

[63] Continuation of application No. 08/547,584, Oct. 24, 1995, abandoned, which is a continuation of application No. 08/215,562, Mar. 21, 1994, abandoned.

[51] Int. Cl.$^6$ .................................................. H04J 3/22
[52] U.S. Cl. .......................... 370/207; 370/529; 370/535; 375/354
[58] Field of Search .................................... 370/203, 204, 370/206, 207, 522, 527, 529, 535, 536, 537, 540, 542; 375/286, 287, 261, 264, 231, 354, 355; 371/30, 43.1, 43.4, 37.11

[56] References Cited

U.S. PATENT DOCUMENTS

| | | | |
|---|---|---|---|
| 4,484,327 | 11/1984 | Hanson | 370/102 |
| 4,807,253 | 2/1989 | Hagenauer et al. | 375/57 |
| 4,811,340 | 3/1989 | McEachern et al. | 370/102 |
| 4,891,806 | 1/1990 | Iarias et al. | 370/110.1 |
| 5,052,000 | 9/1991 | Wang et al. | 371/43 |
| 5,105,443 | 4/1992 | Betts et al. | 375/39 |
| 5,164,963 | 11/1992 | Lawrence et al. | 375/39 |
| 5,214,656 | 5/1993 | Chung et al. | 371/43 |
| 5,233,629 | 8/1993 | Paik et al. | 371/43 |
| 5,258,987 | 11/1993 | Wei | 371/43 |
| 5,305,352 | 4/1994 | Calderbank et al. | 375/39 |
| 5,307,377 | 4/1994 | Chouly et al. | 375/39 |
| 5,321,725 | 6/1994 | Paik et al. | 371/43 |

*Primary Examiner*—Chau Nguyen

[57] ABSTRACT

Data to be transmitted is converted into symbols using a plurality of data-to-symbol conversion processes. The symbols from these processes are then time-division multiplexed. Advantageously, at least one of these conversion processes incorporate coding in a manner which provides the same degree of error protection for each process. In the disclosed embodiments, the data originates from two independent sources and the data from each source is converted into symbols using a different data-to-symbol conversion process.

22 Claims, 3 Drawing Sheets

64 POINT CONSTELLATION FOR ADSL BITS
200

16 POINT CONSTELLATION FOR THE H0+C BITS
300

64 + 16 POINT MULTIPLEXED CONSTELLATION

5,901,135

SIGNAL CONSTELLATION TIME DIVISION MULTIPLEXING ARRANGEMENT

This is a continuation of application Ser. No. 08/547,584 filed Oct. 24, 1995, now abandoned, which in turn is a continuation of application Ser. No. 08/215,562 filed Mar. 21, 1994, now abandoned.

TECHNICAL FIELD

The present invention relates to communications systems and, more particularly, to such systems where transmitted digital data is represented by symbols in a signal constellation and different portions of the transmitted digital data are represented by symbols in different signal constellations.

BACKGROUND OF THE INVENTION

In many digital data applications, the transmitted data is converted into symbols in accordance with a predetermined process and the resulting set of all possible symbols from such a conversion process forms a signal constellation. There are many different conversion processes and signal constellations. For a symbol transmission rate, the data-carrying capacity of the data-to-symbol conversion process is directly proportional to amount of data represented by one symbol. Moreover, the greater the amount of digital data represented by one symbol, the greater the number of possible symbols. In most communications applications, the maximum power which can be transmitted is constrained and, as a result, as the number of possible symbols increases the separation between symbols decreases. Without the use of error correction schemes, the ability to recover the data after transmission through a noisy channel generally decreases with a decrease in the separation between symbols.

Many communications systems utilize a single data-to-symbol conversion process after a communications connection is established. For example, in most modems, during the "handshaking" process prior to data transmission, a particular data-to-symbol conversion process is agreed upon between the communicating modems and this process is maintained for the duration of the communications connection. In other system applications, the data-to-symbol conversion process may be varied during the communications connection in response to a determination of the data recovery error rate. That is, if the data error rate increases, the data-to-symbol conversion process can be altered so as to increase the separation between symbols and, therefore, decrease the likelihood of data recovery errors. In such arrangements, the change from one data-to-symbol conversion process to another occurs aperiodically.

More recently, in U.S. Pat. No. 5,214,656, issued May 25, 1993, two data-to-symbol conversion processes are used. More specifically, certain bits, which are deemed more important than other bits, are converted into symbols lying in a first signal constellation using a first data-to-symbol conversion process. This process provides greater error protection than a second data-to-symbol conversion process which converts the other bits into symbols in a second signal constellation. The symbols generated by each process are then transmitted in a time-division-multiplexed fashion. While this technique works satisfactorily, there are systems applications, such as the Asymmetric Digital Subscriber Line (ADSL), which require equal error protection for all transmitted data and which impose maximum delay requirements on certain transmitted data. In light of the expected widespread use of systems such as ADSL, it would be highly desirable if the above-described shortcomings of the prior art could be eliminated.

SUMMARY OF THE INVENTION

In accordance with the present invention, equal error protection is provided for the different classes of data in a data signal. Each class of data is converted into symbols in a different signal constellation using a different data-to-symbol conversion process. The intersymbol distance in at least one of these signal constellations is different from the intersymbol distance in another one of the signal constellations so that different degrees of error protection would be expected from the use of such constellations. Coding, however, is utilized in a manner such that an equal degree of error protection is provided for all classes of data. The symbols formed for each class of data are then time-division-multiplexed. In the disclosed embodiments, the data originates from two sources and a different data-to-symbol conversion process is used with each source. In one embodiment, one data-to-symbol conversion process incorporates block coding while the other process does not. In another embodiment, one data-to-symbol conversion process incorporates block and trellis coding while the other process incorporates only trellis coding. In the disclosed embodiments, different data rates and different delays are provided for the different classes of data.

DETAILED DESCRIPTION

Figure 1:
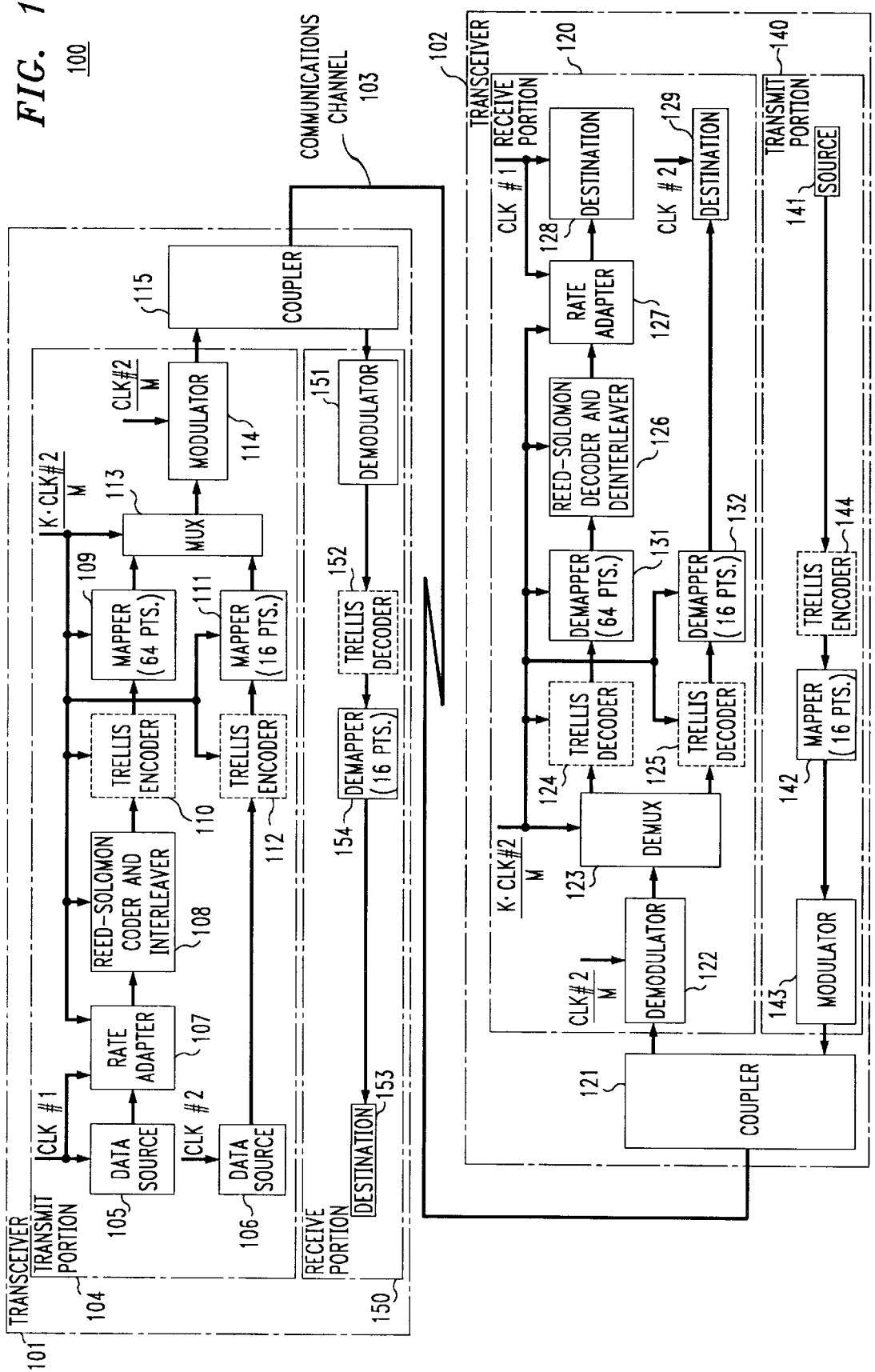
FIG. 1 is a block-schematic diagram of a communications system incorporating alternative embodiments of the present invention.

Referring to FIG. 1, communication system 100 provides an ADSL application by communicating data bidirectionally between transceiver 101 and transceiver 102 via communications channel 103. In such applications, the data rate in one direction, i.e., from transceiver 101 to transceiver 102, is greater than that in the opposite direction. As shown, the data transmitted from transceiver 101 originates from data sources 105 and 106 in transmit portion 104. Each of these sources provides binary data. The bits from source 105 are customer data and the bit rate is customer-controlled and varies about some predetermined nominal rate. The bits from source 106 convey system signaling information and occur at the nominal rate. As a result, "stuff" and "delete" bits are added to the data provided by source 105 by rate adapter 107 to maintain the bit rate at the nominal rate.

In accordance with the present invention, the bits provided by each of sources 105 and 106 is converted into symbols by a different data-to-symbol conversion process. Each of these processes includes the operations performed after receipt of the source bits to the generation of symbols with each symbol representative of one or more bits. The motivation for using two different data-to-symbol conversion processes arises from the fact that bits from both sources 105 and 106 are equally important and due to the noise and dispersion in a typical communications channel, it is desirable to incorporate error protection enhancement techniques, such as coding, in the data-to-symbol conversion processes. If so, such techniques must be implemented in a manner which provides the different data-to-symbol conversion processes with the same degree of error protection. What complicates this implementation is that block coding, such as a Reed-Solomon coder, introduces a delay which is unacceptable for the bits originating from source 106. As a result, as will be described below, what is done is to utilize a lower order signal constellation, i.e., one with fewer symbols, and, hence, a greater intersymbol separation than that used for the bits from source 105. This affords a lower probability of recovery errors for bits from source 106 as compared to those of source 105 and does not introduce propagation delay. To offset the higher probability of recovery errors for the bits from source 105, a coding procedure is incorporated within the data-to-symbol conversion process used for these bits. This coding procedure provides a coding gain. In the embodiments which will be described, the coding gain of the data-to-symbol conversion process for the bits from source 105 is greater than that used for the bits from source 106. Overall, however, considering the effects of the coding and the signal constellation utilized, each of the data-to-symbol conversion processes affords the same degree of error protection.

Referring to FIG. 1, the data-to-symbol conversion process used for the bits from source 105 involves coupling these through rate adapter 107, Reed-Solomon coder and interleaver 108 and mapper 109. Optionally, this process may also include trellis encoding along with the Reed-Solomon coding and interleaving. This additional coding is provided by trellis encoder 110. Rate adapter 107 provides the appropriate stuff and delete bits necessary to maintain the output of source 105 at the nominal rate. The data-to-symbol conversion process for the bits from source 106 involves the use of mapper 111 and also, if desired, the use of trellis encoder 112. Again, these processes convert the data from a source into symbols in a manner which provides the same degree of error protection for both data-to-symbol conversion processes. Multiplexer (MUX) 113 time-division-multiplexes the symbols generated by mappers 109 and 111. The resulting multiplexed symbol stream is then coupled through modulator 114 and coupler 115, the latter inserting the modulator's output signal into the predetermined frequency band for transceiver 101 to transceiver 102 communications. For purposes of illustration, it will be assumed that the modulation provided by modulator 114 is quadrature amplitude modulation (QAM).

After propagating through the communications channel, the transmitted symbols are coupled to receive portion 120 of transceiver 102 wherein coupler 121 extracts the transmitted data and couples this information on to demodulator 122 and thence demultiplexer (DEMUXJ) 123. Demultiplexer 123 separates the symbols provided by mappers 109 and 111 and couples these symbols respectively to demappers 131 and 132. If trellis encoding is used in the transmit portion of transceiver 101, then trellis decoders 124 and 125 are provided, as shown in FIG. 1, between demultiplexer 123 and demappers 131 and 132. In this regard it should be noted that receive portion 102 includes two different symbol-to-data conversion processes which provide the inverse of the data-to-symbol conversion processes in transmit portion 104. In particular, the bits provided by demapper 131 are deinterleaved and decoded by Reed Solomon decoder and deinterleaver 126. Rate adapter 127 reverses the stuff or delete bit process provided by adapter 107 and couples the bits originally provided from source 105 to destination 128. In similar fashion, demapper 132 outputs the bits originally provided from source 106 and couples these bits to destination 129. If trellis encoders 110 and 112 are utilized in transmit portion 104, then trellis decoders 124 and 125 are employed in receive portion 120.

For transceiver 102 to transceiver 101 communications, transmit portion 140 of transceiver 102 converts bits from source 141 into symbols through the use of mapper 142 which are then modulated by modulator 143, inserted into the predefined frequency band by coupler 121, and coupled through communications channel 103 to receive portion 150 of transceiver 101. Demodulator 151, demapper 154 provide operations inverse to those in transmit portion 140 and couple the bits originally provided by source 141 to destination 153. Again trellis coding can be used by the inclusion of trellis encoder 144 and trellis decoder 152 in transmit portion 140 and receive portion 150, respectively.

As discussed above, the bit rate provided by source 105 varies relative to the bit rate provided by source 106. Accordingly, as shown in FIG. 1, source 105 is strobed by clock signal CLK #1 whose rate is customer-controlled, while source 106 is strobed at a predetermined nominal rate designated as CLK#2. To provide for synchronous operation, clock signals $$\frac{K(CLK\#2)}{M} \text{ and } \frac{CLK\#2}{M}$$

where K and M are predetermined integers, are supplied to the components of transmit portion 104 as shown.

In the disclosed embodiment, rate adapter 107 provides a stuff or a delete bit, each frame, to compensate for the bit rate variations in source 105 relative to source 106. A stuff bit is a customer data bit while a delete bit, oftentimes referred to as a "dummy" bit, represents extraneous or auxiliary data. An indication of whether a stuff bit or a delete bit is present in a frame is provided by a stuff/delete indicator bit. The extraneous and auxiliary data is generally not provided to the customer. Extraneous data, however, is "thrown away" in the receiver while auxiliary data, such as secondary channel information, is used by the communication system. When the bit rate from source 105 is higher than that from source 106, a stuff bit representing customer data is provided. Conversely, when the bit rate of source 105 is slower than that of source 106, a delete bit is provided.

Figure 2:
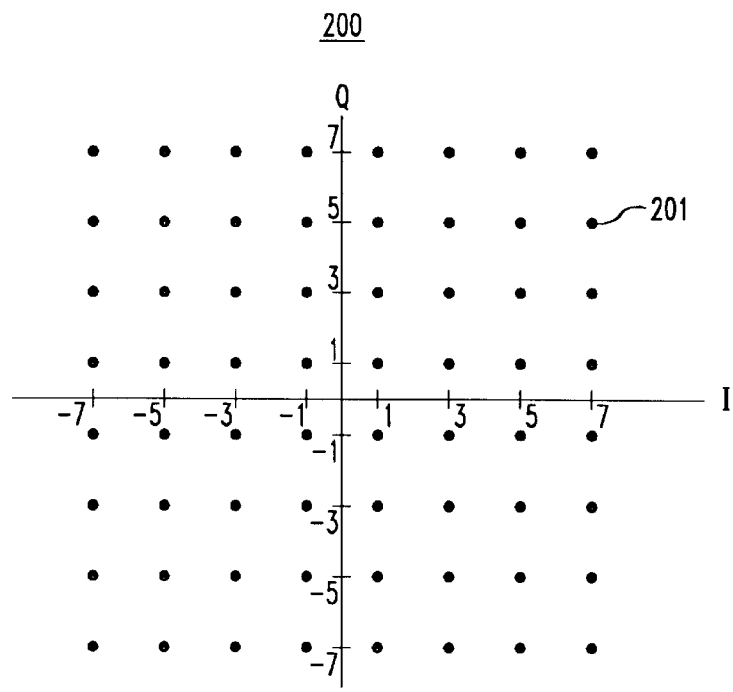
FIGS. 2 and 3 are the signal constellations utilized by the different data-to-symbol conversion processes in the embodiments of FIG. 1.

Mapper 109 converts 6 successive bits from source 105 into a symbol as a function of the 6 bit values. Sixty-four different symbols can be generated. Refer now to FIG. 2 which shows the 64 different symbols on a Cartesian coordinate plot whose abscissa and ordinate respectively are the inphase (I) and quadrature (Q) components of a QAM constellation. Reference numeral 201 designates each of the 64 possible symbols while reference numeral 200 represents the resulting signal constellation.

Figure 3:
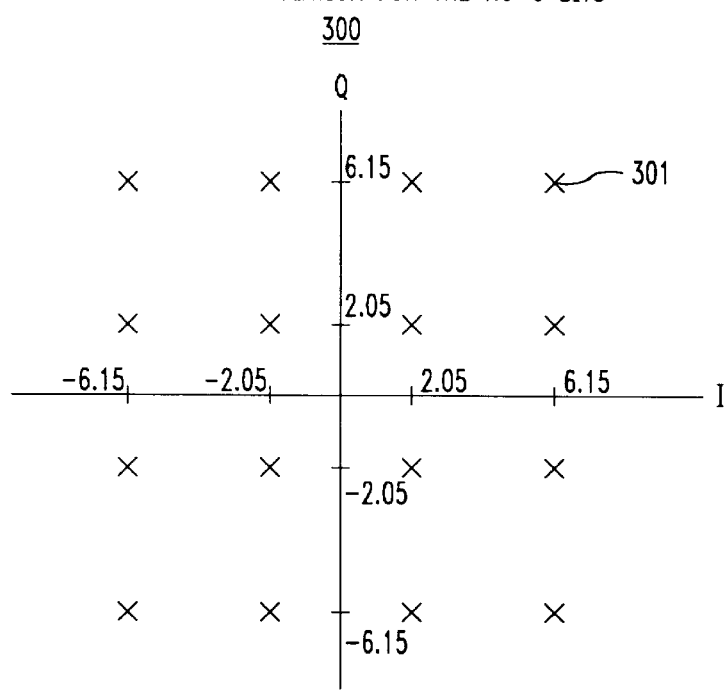
Figure 4:
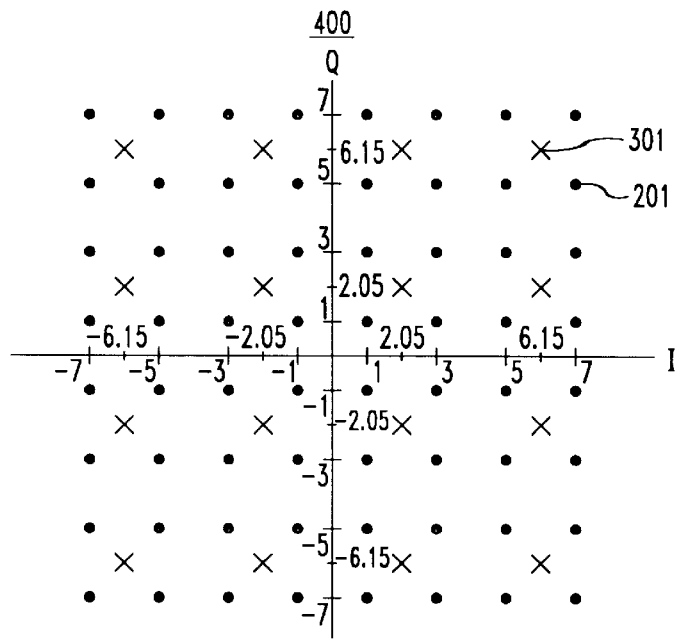
FIG. 4 is the resulting signal constellation resulting from the time-division-multiplexing of the constellations of FIGS. 2 and 3.

Mapper 111 converts 4 successive bits at a time from source 106 into a symbol. Referring to FIG. 3, 16 different symbols 301 lying in signal constellation 300 may be provided by this mapper. Due to constraints on the transmitted power, the intersymbol distance between symbols 201 is smaller than such distance between symbols 301. Accordingly, in the presence of interference and distortion, there is a greater likelihood of errors in recovering the bits from symbols 201 than from 301. To equalize the error probabilities in receive portion 120 associated with recovering bits from sources 105 and 106, the processing of bits from source 105 includes block encoding and interleaving, such as Reed-Solomon coding and interleaving/ deinterleaving, while the processing of bits from source 106 does not. The multiplexing of symbols provided by mappers 109 and 111 results in the transmitted symbols lying in a signal constellation which is an aggregation of all possible symbols 201 and 301. FIG. 4 shows this resulting constellation which is designated by the reference numeral 400.

Figure 5:
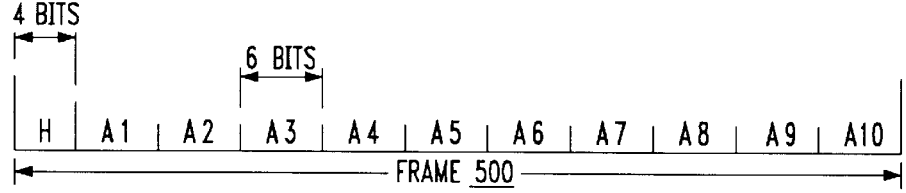
FIG. 5 is a diagram of the symbol format utilized in the embodiments of FIG. 1.
Figure 6:
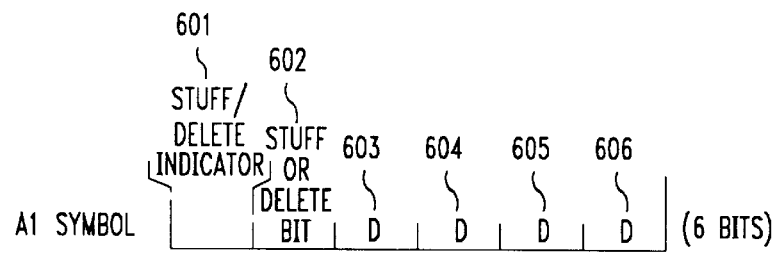
FIGS. 6 and 7 are diagrams of the bits represented by certain symbols in the format of FIG. 5.
Figure 7:
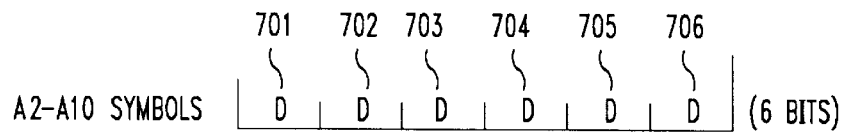

The symbols from multiplexer 113 are arranged into the frame format 500 shown in FIG. 5. Each frame includes 11 symbols with the first symbol, designated by the letter "H", followed by 10 symbols designated as A1 through A10. Each symbol H represents 4 bits from source 106 while each symbol A1 through A10 represents 6 bits from source 105. Two of the six bits represented by symbol A1 are associated with the stuff or delete bit process. As shown in FIG. 6, the bit, designated by reference numerals 601 and 602, is the stuff/delete bit indicator which indicates whether bit 602 is a stuff bit or a delete bit. This choice in each frame depends on the frequency of customer clock CLK #1 relative to CLK #2. If customer bits, then the stuff/delete bit is coupled to destination 128. When the stuff/delete bit is a dummy bit, then it is extracted by rate adapter 127 and not coupled to destination 128. The remaining four bits represented by symbol A1 are customer data or "D" bits and are presented by reference numerals 603–606. As shown in FIG. 7, each of the symbols A2 through A10 represent six customer or D bits. These 6 bits are designated by reference numerals 701 through 706.

It should, of course, be noted that while the present invention has been described in reference to illustrative embodiments, other arrangements may be apparent to those of ordinary skill in the art. For example, while the disclosed embodiments utilize discrete devices, these devices can be implemented using one or more appropriately programmed processors, special-purpose integrated circuits, digital processors, or an analog or hybrid counterpart of any of these devices. In this regard, it should be appreciated that while the coding and mapping functions are shown in the FIG. 1 as being within separate boxes these different functions described can be implemented within a single device. Or, for example, while the disclosed embodiments use a pair of signal constellation having 16 and 64 symbols, the present invention is not limited to such signal constellations but can be used with a variety of different constellations. Indeed, while two classes of data are respectively converted into symbols in two signal constellations, a plurality of classes of data can be converted into symbols in a plurality of signal constellations, one signal constellation associated with each class of data. Or, while the disclosed embodiments utilize a source which outputs data at a nominal rate and another source whose output data rate varies with respect to the first mentioned source, the present invention is also applicable for use with a plurality of asynchronous data sources. In such cases, a rate adapter is associated with each source. Finally, while the disclosed embodiments utilize specific coding schemes, other coding arrangements are possible, e.g., other types of block coding can be used instead of Reed-Solomon coding and convolutional coding can be used instead of trellis coding.

What is claimed:

1. Apparatus for processing a data signal for transmission, said data signal comprising symbols representing data bits from a plurality of different sources of data bits including a first source and a second source, said apparatus comprising:

means for converting data bits from each source of data bits into symbols in a different signal constellation, at least one of these constellations having an intersymbol separation that is different from that of another of these constellations, said converting means utilizing error control coding in a manner so as to provide a) a first desired level of error protection for the data bits from the first source, b) a second desired level of error protection for data bits from the second source, c) a first time delay no greater than a first amount of time for the data bits from the first source, and d) a second time delay no greater than a second amount of time for the data bits from the second source, wherein the first amount of time is greater than the second amount of time and the first desired level of error protection is equal to the second desired level of error protection; and means for time-division-multiplexing the symbols of said data signal.

2. The apparatus of claim 1 further including means for transmitting the time-division-multiplexed symbols through a communications channel.

3. The apparatus of claim 2 wherein said transmitting means includes means for modulating at least one carrier signal with the time-division-multiplexed symbols.

4. The apparatus of claim 3 wherein said transmitting means further includes means for filtering said modulated carrier signal into a predetermined frequency band in said communications channel.

5. The apparatus of claim 1 wherein said conversion means includes first coding means for coding one source of data in said data signal into a first coded signal, and mapping means for mapping this first coded signal into symbols.

6. The apparatus of claim 5 wherein said first coding means includes a block coder.

7. The apparatus of claim 6 wherein said block coder is a Reed-Solomon coder.

8. The apparatus of 5 wherein said first coding means includes a trellis coder concatenated with a Reed-Solomon coder.

9. The apparatus of claim 5 wherein said conversion means includes second coding means, different from said first coding means, for coding another source of data in said data signal into a second coded signal.

10. The apparatus of claim 1 wherein each source of data has an associated data rate and one source of data has a data rate which varies with respect to another data rate and said means for converting includes means for compensating for this rate variation.

11. The apparatus of claim 10 wherein said data signal is a binary signal and said means for converting provides stuff and delete bits.

12. A method for processing a data signal for transmission, said data signal representing a plurality of different sources of data bits including a first source and a second source, said method comprising the steps of;

converting bits from each source of data bits into symbols in a different signal constellation, at least one of these constellations having an intersymbol separation that is different from that of another constellation, said converting step utilizing error control coding in a manner so as to provide a) a first desired level of error protection for the data bits from the first source, b) a second desired level of error protection for data bits from the second source, c) a first time delay no greater than a first amount of time for data bits from the first source, and d) a second time delay no greater than a second amount of time for data bits from the second source, wherein the first amount of time is greater than the second amount of time and the first desired level of error protection is equal to the second desired level of error protection; and time-division-multiplexing the symbols formed in said conversion step.

13. Apparatus for processing a received signal comprising symbols representative of data from a plurality of different sources including a first source and a second source, said apparatus comprising:

means for time division demultiplexing said received signal into a plurality of symbol streams, each of said symbol streams including symbols in a different signal constellation, at least one of these constellations having an intersymbol separation that is different from that of another of these constellations; said symbols having been coded from their representative data in a manner so as to provide a) a first desired level of error protection for the data from the first source, b) a second desired level of error protection for the data from the second source, c) a first time delay no greater than a first amount of time for the data from the first source, and d) a second time delay no greater than a second amount of time for the data from the second source, wherein the first amount of time is greater than the second amount of time and the first desired level of error protection is equal to the second desired level of error protection; and means for converting each symbol stream into data from the respective source.

14. The apparatus of claim 13 further including means for receiving said received signal from a communications channel.

15. The apparatus of claim 14 wherein said received signal is in a predetermined frequency band and said receiving means includes a filter for extracting said received signal from said band.

16. The apparatus of claim 15 wherein received signal includes at least one carrier signal and said receiving means includes means for demodulating said carrier signal into symbols.

17. The apparatus of claim 13 wherein said means for converting includes first decoder means and mapping means, such that the means for converting provides bits representing one source of data from one of said symbol streams.

18. The apparatus of claim 17 wherein said first decoder means includes a block decoder.

19. The apparatus of claim 18 wherein said block decoder is a Reed-Solomon decoder.

20. The apparatus of claim 17 wherein said first decoding means includes a trellis decoder serially connected to a Reed-Solomon decoder.

21. The apparatus of claim 17 wherein said means for converting includes second decoding means, different from said first decoding means, for decoding said received signal into bits representing a second source of data.

22. A method of processing a received signal comprising symbols representative of information from a plurality of different sources including a first source and a second source, said method comprising the steps of;

time division demultiplexing said received signal into a plurality of symbol streams, each of said symbol streams including symbols in a different signal constellation, at least one of these constellations having an intersymbol separation that is different from that of another of these constellations, said symbols having been coded from their representative data so that a) a first desired level of error protection is provided for the information from the first source, b) a second desired level of error protection is provided for the information from the second source, c) a first time delay no greater than a first amount of time is applied to the information from the first source, and d) a second time delay no greater than a second amount of time is applied to the information from the second source, wherein the first amount of time is greater than the second amount of time and the first desired level of error protection is equal to the second desired level of error protection; and converting each symbol stream into a corresponding bit stream representing information from the respective source.

* * * * *